Aug. 3, 1965 R. KÜHNE 3,199,079
APPARATUS FOR READING CHARACTERS RECORDED ON A CARRIER
BY PRODUCING CORRESPONDING ELECTRICAL IMPULSES
Filed Aug. 15, 1960 3 Sheets-Sheet 1

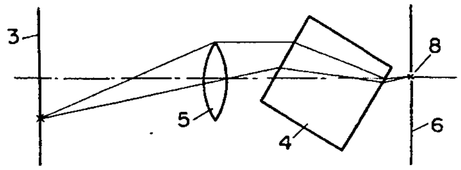
Fig. 3
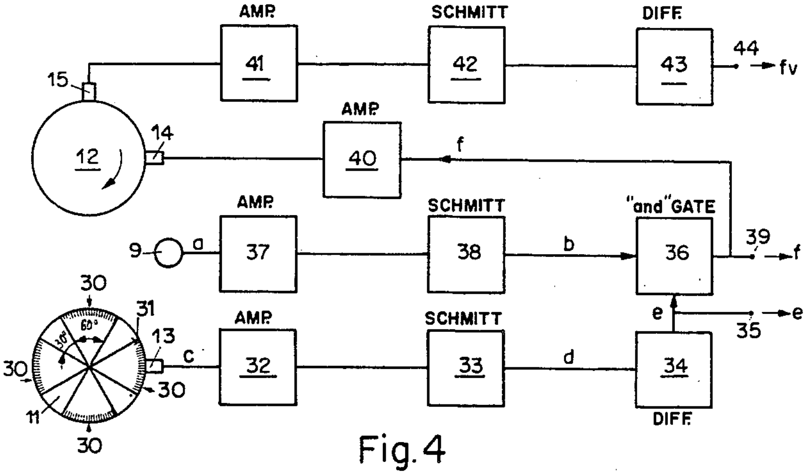
Fig. 4
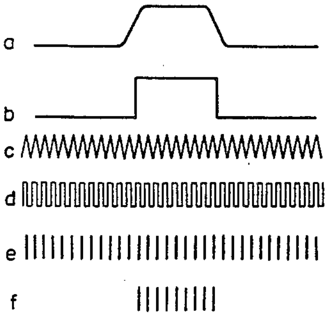
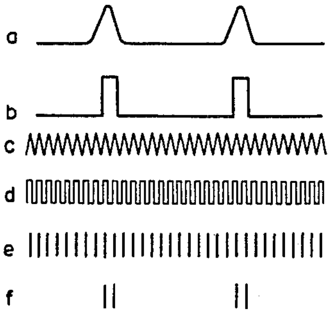
Fig. 5 Fig. 6

United States Patent Office 3,199,079
Patented Aug. 3, 1965

3,199,079

APPARATUS FOR READING CHARACTERS RECORDED ON A CARRIER BY PRODUCING CORRESPONDING ELECTRICAL IMPULSES

Rudolf Kühne, Bern, Switzerland, assignor to Ruf-Buchhaltung Aktiengesellschaft, Zurich, Switzerland Filed Aug. 15, 1960, Ser. No. 49,745
Claims priority, application Switzerland, Aug. 17, 1959, 77,047/59; June 23, 1960, 7,143/60
10 Claims. (Cl. 340—146.3)

The present invention relates to an apparatus for reading characters recorded on a carrier by producing corresponding electrical impulses, particularly for accounting-, data processing- and calculating machines.

It is an object of the present invention to provide an apparatus of the kind referred to capable of automatically carrying forward the balance.

It is another object of the invention to provide an apparatus of the kind referred to capable of optically scanning visually readable characters, such as letters, numbers and operation signs written by a printing accounting machine or the like, and of converting the same into optical impulses which can be evaluated in evaluating apparatus, for example in order to print again the characters read off by scanning.

It is yet another object of the invention to provide an apparatus of the kind referred to capable of being built very compact, so that it requires but little space, a fact which is of importance for example with accounting machines.

It is still another object of the invention to provide an apparatus of the kind referred to which is constructed so simply that it can be operated without any difficulty by a person unskilled in the technical art.

With these and other objects in view which will become apparent later from this specification and accompanying drawings, I provide an apparatus for reading characters recorded on a carrier by producing corresponding electrical impulses, comprising in combination: means for supporting said carrier, an optical scanning device for scanning said carrier, column by column, including an optical deflecting element rotatably mounted about an axis substantially parallel to and remote from the plane of said carrier and an object lens interposed between said carrier and said deflecting element, a light-sensitive electrical element mounted so as to receive images of successive points on said carrier through said scanning device, a magnetic drum rotatable with said deflecting element, a magnetizable trace on the periphery of said drum, means connecting said light-sensitive element with said magnetic drum so as to magnetize said trace according to said image received by said element and a reading head adapted to deliver electrical impulses corresponding to a grid line of the carrier read off said trace.

These and other features of my said invention will be clearly understood from the following description of two embodiments thereof given by way of example with reference to the accompanying drawings in which:

FIG. 3 shows the beams in the optical scanning apparatus.

FIG. 4 shows a block diagram of the electrical connections of the reading arrangement.

FIG. 5 shows various electrical impulses formed by scanning of the character of FIG. 2 in a vertical column.

FIG. 6 is a representation corresponding to FIG. 5 in respect of a different scanning column.

Figures 1, 2:
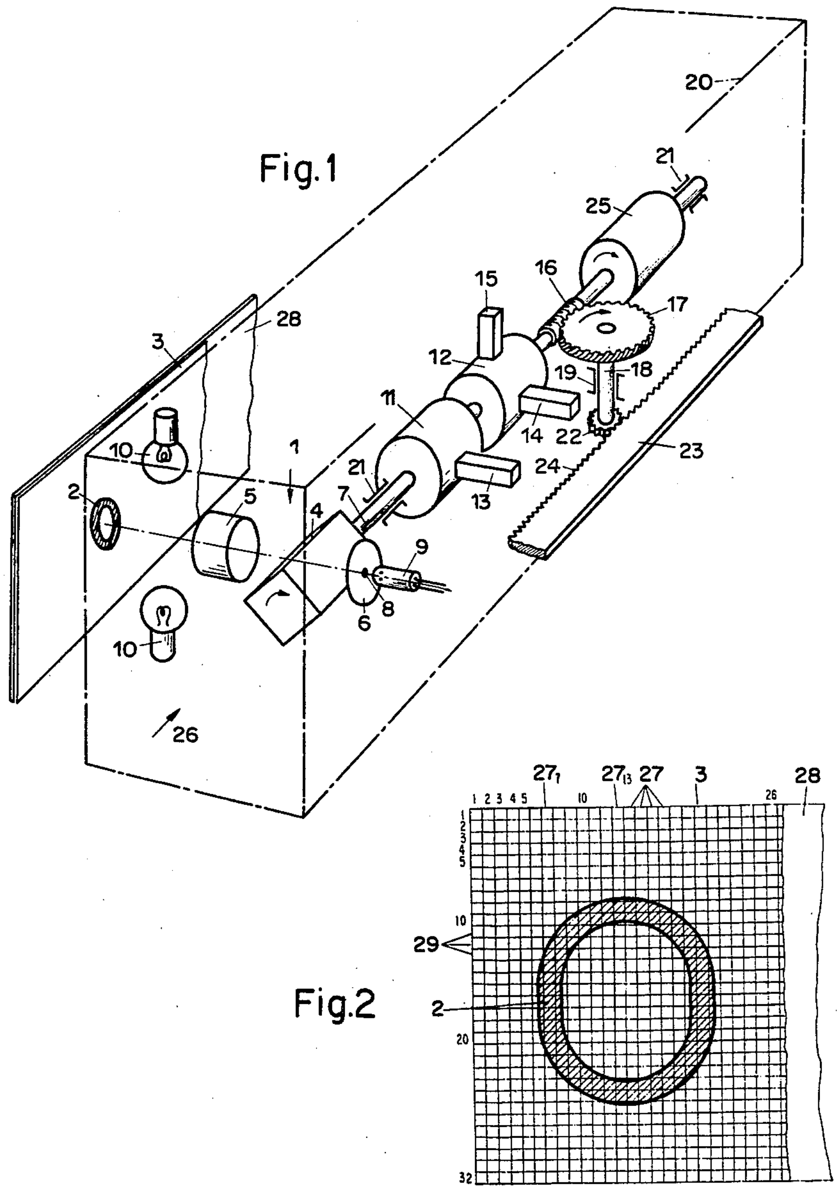
FIG. 1 is a schematic representation of several essential parts of a first reading arrangement.
FIG. 2 is a view of a carrier with a character.

The reading arrangement shown in FIG. 1 comprises an optical scanning apparatus 1 which serves for the scanning of characters 2 recorded, e.g. printed on a carrier 3. The carrier 3 is, for example, a paper strip of a printing calculating machine and the reading arrangement is intended to read a numeral, e.g. a balance of this numeral only the digit "0" is shown in FIG. 2.

The optical scanning apparatus 1 comprises an optical prism 4 having a square cross-section, i.e. two pairs of parallel planes. The prism 4 is arranged between an object lens 5 and an apertured diaphragm 6 and fixed on a horizontal shaft 7 extending in the direction of the longitudinal axis of the prism. A light-sensitive electrical element, e.g. a photo-diode 9 is disposed directly behind the aperture 8 in the diaphragm 6. As shown in FIG. 3, points of the object plane, i.e. of the plane of the carrier 3, disposed one above the other in a column are successively projected on to the aperture 8 through the object lens 5 and the prism 4. The arrangement is such that the scale of image reproduction is at least approximately 1:1. With this scale, for a given focal length of the object lens the distance between the object plane and the image plane, and thus the dimension of the apparatus 1 in the direction of its optical axis is a minimum. The apparatus 1 further comprises two incandescent lamps 10 for illuminating the carrier 3.

Two drums 11 and 12 whose circumference is provided with a magnetisable layer are fixed to the shaft 7. A reading head 13 cooperates with the magnetic drum 11, while a recording head 14 and a reading head 15 cooperate with the magnetic drum 12. Furthermore a worm 16 is mounted on the shaft 7 and meshes with a worm wheel 17 whose vertical axis 18 is journalled at 19 on a carriage or slide 20 slidable in the direction of the shaft 7. The horizontal shaft 7 is also journalled on this carriage or slide 20 at 21. A pinion 22 is mounted on the vertical axis 18 and meshes with a rack 24 fixed to a fixture 23. The rotor of an electric motor 25 is also mounted on the shaft 7.

It will be seen that, as the motor 25 rotates, the pinion 22 traverses along the rack 24, whereby the carriage 20 is moved forwardly in the direction of the arrow 26. Thereby the carrier 3 is scanned at the place provided for a character 2 in twenty six successive, almost vertical columns 27, as shown in FIG. 2. The columns 27 are not exactly vertical because in the course of the scanning of a column the carriage 20 continually moves forward a certain distance. For every full revolution of the prism 4, four consecutive columns 27 are scanned. During each quarter of a revolution the prism is effective for the formation of an image over an angle of about 60° and ineffective over an angle of about 30°, in other words, image formation of the points on the object plane is still sufficiently accurate, as long as the angle between the plane of the prism on which the beams impinge and the optical axis does not exceed 30°. The height $h$ of the carrier 3 is so chosen that all the points on it are still within the region of good image formation. The carrier 3 is of course disposed on a backing plate 28 or the like which is fixed to the fixture 23 and parallel to the rack 24.

In FIG. 2 there is shown, in addition to the almost vertical column division, a line division containing thirty-two lines 29. By means of optical scanning, the apparatus first of all determines whether the individual grid points defined by the intersection of the columns 27 and lines 29 are white or black. The latter is the case if they lie on the character 2. Some grid points are partly black and partly white, namely if they lie only partly on the character 2.

In order to produce impulses corresponding to a grid line, four groups 30 of thirty-two permanent, magnetic dipoles 31 each are, according to FIG. 4, provided on the magnetic drum 11, said dipoles having been produced by a single magnetising operation, and are referred to as a "grid magnetising trace." The dipole groups 30 each extend over an angle of 60° and between each of two adjacent groups an angle of 30° is free from dipoles.

The output from the reading head 13 by means of which the grid magnetising trace of the magnetic drum 11, referred to as the grid magnet drum, is read, is connected to an amplifier 32 to which a Schmitt circuit 33 is connected. As is well known, a Schmitt circuit has the property of converting an electrical impulse which is only approximately rectangular, e.g., trapezoidal, into a sharply defined, exactly rectangular impulse. A Schmitt circuit is, for example, described in the Journal of Scientific Instruments, vol. 15, 1938, page 24 et seq.

The output from the Schmitt circuit 33 is connected to a well known differentiating circuit 34 for the production of sharp impulses at the rising or falling flanks of the rectangular impulses. The output from the differentiating circuit 34 is connected on the one hand to an output terminal 35 of the reading arrangement and, on the other, to a first input to a gate circuit 36.

The output from the photo diode 9 is connected to an amplifier 37 to which a Schmitt circuit 38 is connected which, in turn, is connected to a second input to the gate circuit 36. The output from the gate circuit 36 is, on the one hand, connected to a second output terminal 39 of the reading arrangement and, on the other, to the input to an amplifier 40, which feeds the recording head 14, which records impulses described hereinafter in greater detail and each corresponding to a column 27, on the magnetic drum 12 which will hereinafter be referred to as the storage magnet drum. These impulses are read by the reading head 15, namely—in the present angular transposition of 270° in the direction of rotation relative to the recording head—with a lag of three columns relative to the column whose impulses act on the recording head 14 at the time.

The reading head 15 is connected to an amplifier 41 which is connected to a Schmitt circuit 42 which in turn feeds a differentiating circuit 43. The output from the differentiating circuit 43 is connected to a third output terminal 44 of the reading arrangement. The operation of the reading arrangement described will now be explained in greater detail with the aid of FIG. 5 or 6.

FIG. 5 shows the impulses which are formed at various points of the circuit according to FIG. 4, in the course of the scanning of the column designated as $27_7$ in FIG. 2.

The photo-diode 9 supplies the amplifier 37 an impulse designated *a*, which extends over the region in which the 0-character shown is scanned, i.e. in which the successively presented points are black. The flanks of the impulse *a* are not vertical since the marginal grid points are only partly black. The impulse *a* which is amplified in the amplifier 37 is converted into a sharply defined rectangular impulse *b* by the Schmitt circuit 38.

The reading head 13 supplies the amplifier 32 with thirty-two impulses C with inclined flanks, derived from each dipole group 30. The Schmitt circuit 33 converts the previously amplified grid impulses into the same number of rectangular impulses *d* and the differentiating circuit 34 generates from the latter the same number of very sharp grid impulses *e*. In known manner the gate circuit 36 permits the passage of impulses *e* only when an impulse *b* is simultaneously present. Thus a group of nine impulses *f* is obtained for the column $27_7$ at the output from the gate circuit 34, which are designated characteristic impulses because they are characteristic of the character being read.

The characteristic impulses *f* are recorded on the storage magnet drum 12 via the amplifier 40 and the recording head 14 and again read by the reading head with a displacement of three columns. After recording and reading, the nine characteristic impulses *f* are no longer sharp but rather have the shape of the impulses *c*; after amplification by the amplifier 41, rendering rectangular by the Schmitt circuit 42 and differentiation by the differentiating circuit 43, however, these nine impulses are restored to their original sharp form. The displaced impulses supplied by the differentiating circuit 43 are designated *fv* in FIG. 4 but are not separately illustrated since, of course, they have the same shape as the impulses *f*.

In FIG. 6 the same impulses *a–f* as in FIG. 5 are shown, but for column $27_{13}$. It will be noted that in this case the photo-diode supplies two relatively short impulses *a* and that correspondingly two groups of only two sharp impulses *f* each occur.

Thus the reading arrangement supplies the following impulses.

At the output terminal 35 a group of sharp grid impulses *e*, namely always the same number of impulses for the scanning of each column, thirty-two in the present example.

At the output terminal 39 one or more groups of sharp characteristic impulses *f*, which represent the grid points which lie on the character 2, e.g. the "0" in the column in question.

At the output terminal 44 one or more groups of impulses *fv*, designated "memory impulses," which are the same as the impulses *f* at the output terminal 39 but displaced by three columns.

It is emphasized that all the output signals of the reading arrangement are digital signals, which enables a more reliable evaluation than signals in which the course of the amplitude is a measure of signal content.

The output impulses *e, f* and *fv* may, for example, be supplied to a utilisation device in the form of printing apparatus which determines which character has been read, as a result of the impulse groups received successively from the twenty six columns, and which prints this character. In this manner the digits of a twelve digit numeral are, for example, read successively through scanning of the carrier 3, corresponding electrical impulses generated and thereafter the numeral is again printed by the printing arrangement. After scanning of the whole carrier in the direction of the arrow 26, the motor 25 is automatically switched over in order to return the carriage or slide 20 to the starting position.

The impulses supplied by the reading arrangement can also be utilised in utilisation devices other than printing apparatus, e.g. in calculating machines. The utilisation devices do not form part of the invention.

The storage magnet drum 12 with the devices 40, 14, 15, 41–43 appertaining thereto can also be omitted. In that case the reading arrangement only has the two output terminals 35 and 39 which supply the impulses *e* and *f*. This simplified construction can suffice if a particularly suitable form of characters is used and the utilisation devices are appropriately constructed. Generally, however, it is of great advantage from the the point of view of the utilisation devices, for the reading arrangement to supply, simultaneously with the characteristic impulses *f* of a column, the memory impulses *fv* of a previously read column, since important conclusions regarding the shape of the character may be drawn from this comparison of the impulses *f* and *fv*.

It is by no means essential to displace the impulses *fv* from the impulses *f* by exactly three columns; in certain circumstances reading heads 15 may be used with corresponding devices 41–43 for the storage magnet drum 12. In that case a second group of memory impulses *fv* is obtained which, however, have a different displacement from the read impulses *f*. If very considerable displacements are desired, a plurality of recording heads 14 and of reading heads 15 may also be arranged on a plurality of recording tracks on the storage magnet drum 12 and change-over devices provided for supplying the impulses $f$ to the various recording heads 14 at predetermined intervals of time and likewise collecting the impulses $fv$ from the various reading heads 15. In general, however, these measures would not appear to be necessary.

It is important that the vertical and horizontal distance between the grid points must be smaller than the thickness of the lines of the character. Clearly if the arrangement described contains a carrier 3 having character 2 with lines of, for example, a thickness of, say, a quarter of that of the "0" illustrated, the reading arrangement cannot function correctly because there would be no completely black points.

The "object point" diameter corresponding to the diameter of the aperture 8 in the diaphragm 6 on the side of the object need, of course, not correspond exactly to the width of a column 27, but could also be somewhat larger or smaller.

In principle a prismatic mirror body could also be used in place of the rotating prism 4. In that case, however, the useful image region would be appreciably less than 60°. The prism 4 need not necessarily be of square cross-section; the latter could also, for example, be the shape of a regular hexagon or octagon. Naturally the grid magnetising trace 30 would then also have to be altered, since six and eight columns respectively would then be scanned for each revolution of the drum.

In the constructional example according to FIGS. 1 and 2 a storage magnet drum 12 is provided by means of which characteristic impulses corresponding to the grid points of a column of the carrier are transmitted with a delay so that a utilisation device can be supplied simultaneously with impulses originating from two different columns.

In the constructional example described hereinafter with reference to FIGS. 7 and 8 the same result is achieved in simpler manner. The reading arrangement according to FIGS. 7 and 8 is characterised in that the optical scanning apparatus simultaneously scans several columns of the carrier and successively forms an image of the points of each of these columns on separate light-sensitive, electrical elements.

Figure 7:
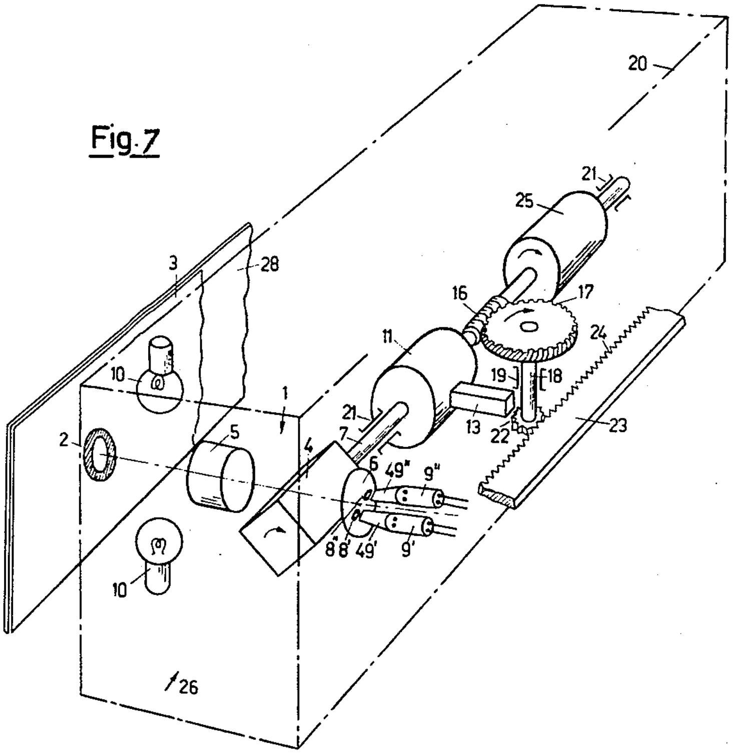
FIG. 7 is a representation corresponding to FIG. 1 of the second constructional example.
Figure 8:
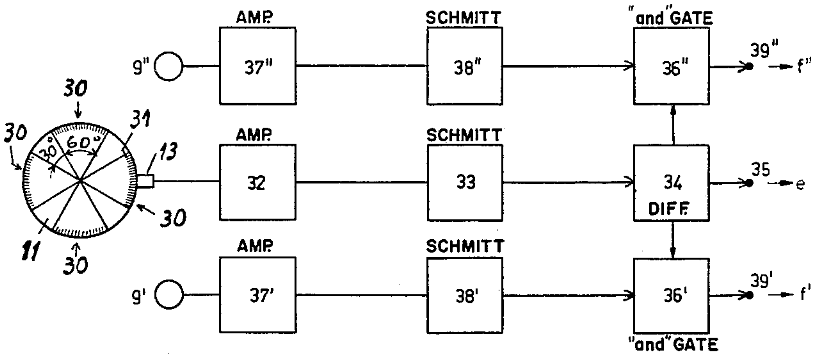
FIG. 8 is the electrical block schematic diagram for the reading arrangement of FIG. 7.

FIG. 7 largely correspond to FIG. 1 and like integers are designated by like reference symbols. The storage magnet drum 12, recording head 14 and reading head 15 are omitted.

The diaphragm 6 has two apertures 8′ and 8″, behind which two slightly conical glass rods 49′, 49″ are disposed which conduct the beams passing through the apertures 8′ and 8″ on to two photo-diodes 9′ and 9″ respectively upon rotation of the prism 4, the points of two columns of the carrier 3 are simultaneously projected through the object lens 5 and the prism 4 on to the apertures 8′ and 8″ so that the photo-diodes 9′ and 9″ either receive light or not depending on whether these points are white or black. The simultaneously scanned columns may be adjacent or may be mutually spaced by one, two or several columns.

For each full revolution of the prism 4 each photo-cell 9′ and 9″ again scans four successive columns 27 (see FIG. 2).

In order to generate the impulses corresponding to one line of the grid four groups 30 of permanent magnetic dipoles 31 are again provided on the magnetic drum 11, as shown in FIG. 8.

The output from the reading head 13 with which the grid magnetising trace of the grid magnet drum 11 is read is connected to an amplifier 32 to which a Schmitt-circuit 33 is connected, as in FIG. 2.

The output from the Schmitt-circuit 33 is connected to a differentiating circuit 34 for generating sharp grid impulses. The output from the differentiating circuit 34 is connected on the one hand to an output terminal 35 of the reading arrangement and, on the other, to two gate circuits 36′ and 36″.

The outputs from the photo-diodes 9′ and 9″ are connected to amplifiers 37′ and 37″ respectively to which Schmitt-circuits 38′ and 38″ respectively are connected, which, in turn, are connected to the gate circuits 36′ and 36″ respectively. The outputs from the gate circuits 36′ and 36″ are respectively, connected to a second and a third output terminal 39′ and 39″ of the reading arrangement.

As is clearly apparent from the detailed description of FIGS. 2 and 4–6, the gate circuits 38′ and 38″ provide characteristic impulses $f'$ and $f''$ at the output terminals 39′ and 39″ respectively, which correspond to the two scanned columns and which, together with the grid impulses $e$, can be utilised in exactly the same way as the characteristic impulses $f$ and the displaced characteristic impulses ("memory impulses") $fv$ in the first constructional example. As compared with the latter, there is the advantage that the delaying means for the characteristic impulses, particularly the storage magnet drum are omitted. It is clearly apparent that more than two columns could also be scanned simultaneously by the provision of further photo-elements, in which case the output from the differentiating circuit 34 would have to be connected to the gate circuits provided in conjunction with these further photo-elements. Generally, however, the simultaneous scanning of more than two columns would appear to be superfluous.

While I have described herein and illustrated in the accompanying drawings what may be considered a typical and particularly useful embodiment of my said invention, I wish it to be understood that I do not limit myself to the particular details and dimensions described and illustrated for obvious modifications will occur to a person skilled in the art.

What I claim as my invention and desire to secure by Letters Patent is:

1. Apparatus for reading characters recorded on a carrier by producing corresponding electrical impulses, comprising in combination: means for supporting said carrier, an optical scanning device for scanning said carrier, column by column, including an optical deflecting element rotatably mounted about an axis substantially parallel to and remote from the plane of said carrier and an object lens interposed between said carrier and said deflecting element, a light-sensitive electrical element mounted so as to receive images of successive points on said carrier through said scanning device, a magnetic drum rotatable with said deflecting element, a magnetized trace on the periphery of said drum, a reading head adapted to deliver electrical impulses corresponding to grid lines of the carrier read off said trace, and gate means connected to said light-sensitive element operable to pass electrical impulses delivered from said reading head in response to said images received by said light-sensitive element.

2. Apparatus according to claim 1, wherein said deflecting element is an optical prism having at least one pair of parallel planes, and further including a member mounted for sliding movement parallel to the plane of said carrier and supporting said object lens and light-sensitive element, a rotatably mounted shaft and an electric driving motor therefor, said magnetic drum, prism and the rotor of said driving motor being mounted on said shaft for rotation therewith.

3. Apparatus according to claim 2, including power transmission means connecting said motor and said member, whereby to slide said member as said shaft rotates and successively scan the carrier, column by column.

4. Apparatus according to claim 2, wherein the object lens and the prism reproduce the points on the carrier at least approximately to the scale 1:1.

5. Apparatus according to claim 1, including a Schmitt-circuit connected to said reading head and a differentiating circuit connected between said gate means and said Schmitt-circuit for converting the impulses supplied by the reading head into sharp grid impulses, and an output terminal connected so as to make said sharp grid impulses available for passing on to a utilization device.

6. Apparatus according to claim 5, including a second Schmitt-circuit connected so as to be supplied with impulses generated by said light-sensitive electrical element, in the course of the scanning of a character, said gate means connected so as to receive the output from said second Schmitt-circuit and also the output from said differentiating circuit, so that said gate means provides one or more groups of sharp characteristic impulses which correspond to grid points lying in a column on a character, and a second output terminal connected so as to make said characteristic impulses available for passing on to said utilization device.

7. Apparatus according to claim 6, including a recording head connected to receive said characteristic impulses, a storage magnet drum arranged to have said characteristic impulses recorded thereon by said recording head, at least one reading head arranged to read said characteristic impulses off said storage magnet drum with a displacement of at least one column, a third Schmitt-circuit and a second differentiating circuit connected to restore to said characteristic impulses their original sharp form, and a third output terminal connected so as to make said characteristic impulses available, as memory impulses, for passing on to said utilization device.

8. Apparatus according to claim 1, including additional light-sensitive electrical elements, wherein the optical scanning device is adapted simultaneously to scan several columns of the carrier and successively to reproduce images of the points of each of these columns on an individual said light-sensitive electrical element.

9. Apparatus according to claim 8, including a Schmitt-circuit and a gate circuit for each additional light-sensitive element connected so as to receive impulses therefrom, a further Schmitt-circuit and a differentiating circuit connected so as to receive impulses from said reading head, and output terminals for said gate means and said gate circuits and said differentiating circuit, so that characteristic impulses corresponding to the scanned columns are available at the output terminals of the gate circuits, and grid impulses are available at the output terminal of the differentiating circuit, for passing on to a utilization device.

10. Apparatus according to claim 8, including a screen provided with a plurality of apertures arranged behind said deflecting element, and glass rods defining light conductors between these apertures and the corresponding light-sensitive elements.

References Cited by the Examiner

UNITED STATES PATENTS

| | | | |
|---|---|---|---|
| 2,222,937 | 11/40 | Dimmick | 178—7.6 |
| 2,403,984 | 7/46 | Koenig et al. | 346—74 |
| 2,652,554 | 9/53 | Williams et al. | 340—174.1 |
| 2,859,653 | 11/58 | Blackstone et al. | 178—7.6 X |
| 2,898,176 | 8/59 | McNaney | 88—16 |
| 2,898,401 | 8/59 | McLucas | 179—100.1 X |
| 2,978,675 | 4/61 | Highleyman | 340—149 |

MALCOLM A. MORRISON, *Primary Examiner.*

IRVING L. SRAGOW, *Examiner.*